(12) United States Patent
Anderson et al.

(10) Patent No.: US 10,594,942 B2
(45) Date of Patent: Mar. 17, 2020

(54) DELINEATED MONITORING FOR UBIQUITOUS COMPUTING

(71) Applicant: Intel Corporation, Santa Clara, CA (US)

(72) Inventors: Glen J. Anderson, Beaverton, OR (US); Giuseppe Raffa, Portland, OR (US); Sangita Sharma, Portland, OR (US); Carl S. Marshall, Portland, OR (US); Selvakumar Panneer, Hillsboro, OR (US); Meng Shi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 15/477,059

(22) Filed: Apr. 1, 2017

(65) Prior Publication Data
US 2018/0284269 A1    Oct. 4, 2018

(51) Int. Cl.
| | |
|---|---|
| *H04N 5/225* | (2006.01) |
| *H04N 5/232* | (2006.01) |
| *G01S 3/786* | (2006.01) |
| *H04W 4/021* | (2018.01) |
| *G06F 3/03* | (2006.01) |
| *G06F 3/01* | (2006.01) |

(52) U.S. Cl.
CPC ....... *H04N 5/23287* (2013.01); *G01S 3/7864* (2013.01); *G06F 3/011* (2013.01); *G06F 3/0304* (2013.01); *H04W 4/021* (2013.01)

(58) Field of Classification Search
USPC ........................................................ 348/169
See application file for complete search history.

(56) References Cited

U.S. PATENT DOCUMENTS

| | | | |
|---|---|---|---|
| 2011/0163916 A1* | 7/2011 | Bamidele .................. | G01S 5/14 342/451 |
| 2012/0176496 A1* | 7/2012 | Carbonell .............. | H04N 7/188 348/143 |
| 2016/0004913 A1* | 1/2016 | Park ...................... | G06K 9/2081 382/103 |
| 2016/0092739 A1* | 3/2016 | Oami .................. | G06K 9/00771 348/159 |
| 2016/0275375 A1* | 9/2016 | Kant ..................... | G06K 9/4604 |
| 2017/0268793 A1* | 9/2017 | Cardonha .......... | G06K 9/00711 |
| 2018/0059248 A1* | 3/2018 | O'Keeffe .............. | G01S 7/4817 |
| 2018/0120873 A1* | 5/2018 | Radermacher ........ | F24F 5/0017 |
| 2018/0341834 A1* | 11/2018 | Qian .................... | G06K 9/6267 |

FOREIGN PATENT DOCUMENTS

| | | | | | |
|---|---|---|---|---|---|
| TW | 2010-01344 | * | 1/2010 | .......... | G08B 13/196 |
| TW | 201001344 | * | 1/2010 | | |

* cited by examiner

*Primary Examiner* — Behrooz M Senfi
(74) *Attorney, Agent, or Firm* — Jordan IP Law, LLC

(57) ABSTRACT

Systems, apparatuses and methods may provide for visually or audibly indicating to users what areas are being covered or monitored by cameras, microphones, motion sensors, capacitive surfaces, or other sensors. Indicators such as projectors, audio output devices, ambient lighting, haptic feedback devices, and augmented reality may indicate the coverage areas based on a query from a user.

27 Claims, 13 Drawing Sheets

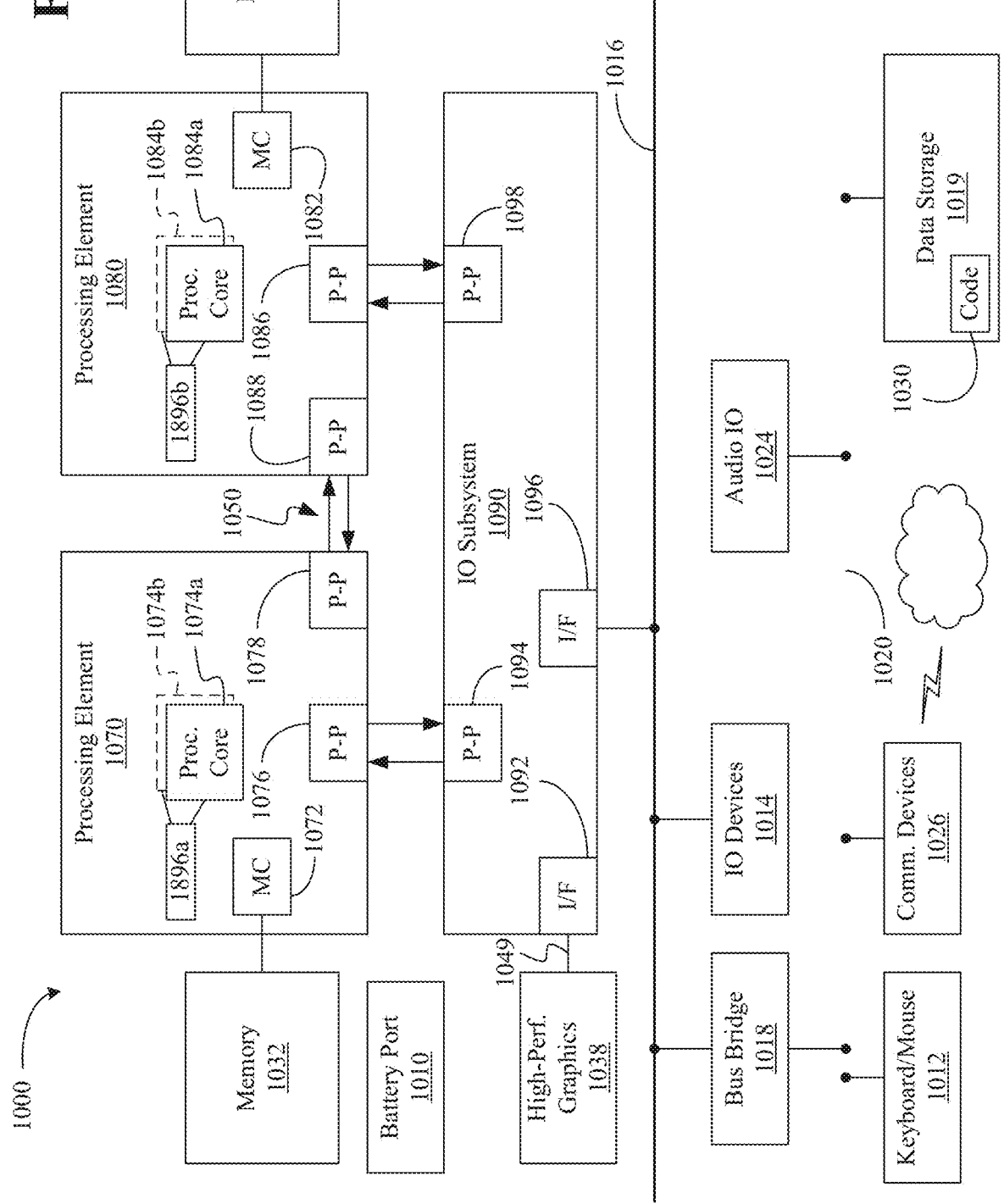

# DELINEATED MONITORING FOR UBIQUITOUS COMPUTING

BACKGROUND

Technical Field

Embodiments generally relate to technology that enables the delineation or indication of spaces that are being monitored by various sensors.

Discussion

Ubiquitous or persuasive computing is a concept where computer processing may occur in various aspects of the environment. Ubiquitous computing may occur at any time or place, in any data format and across any network. Persuasive computing has evolved to include not only laptop computers and smartphones, but also wearable devices, sensors, lighting systems, and appliances. For example, in a domestic ubiquitous computing environment, lighting and environmental controls or sensors may be interconnected with biometric monitors so that heating and lighting conditions in a particular space may be continuously modulated.

One of the challenges of ubiquitous computing is that continuous monitoring of specific spaces may intrude in the privacy of users present within the spaces and the users may not know that they are being monitored. Additionally, hackers may easily access the system and control the sensors with a software virus, or external companies may easily access data that the users would like to remain private.

BRIEF DESCRIPTION OF THE DRAWINGS

The various advantages of the embodiments of the present invention will become apparent to one skilled in the art by reading the following specification and appended claims, and by referencing the following drawings, in which:

FIG. 7 is a block diagram of an example of a computing system according to an embodiment.

DETAILED DESCRIPTION OF EXEMPLARY EMBODIMENTS

Figure 1A:
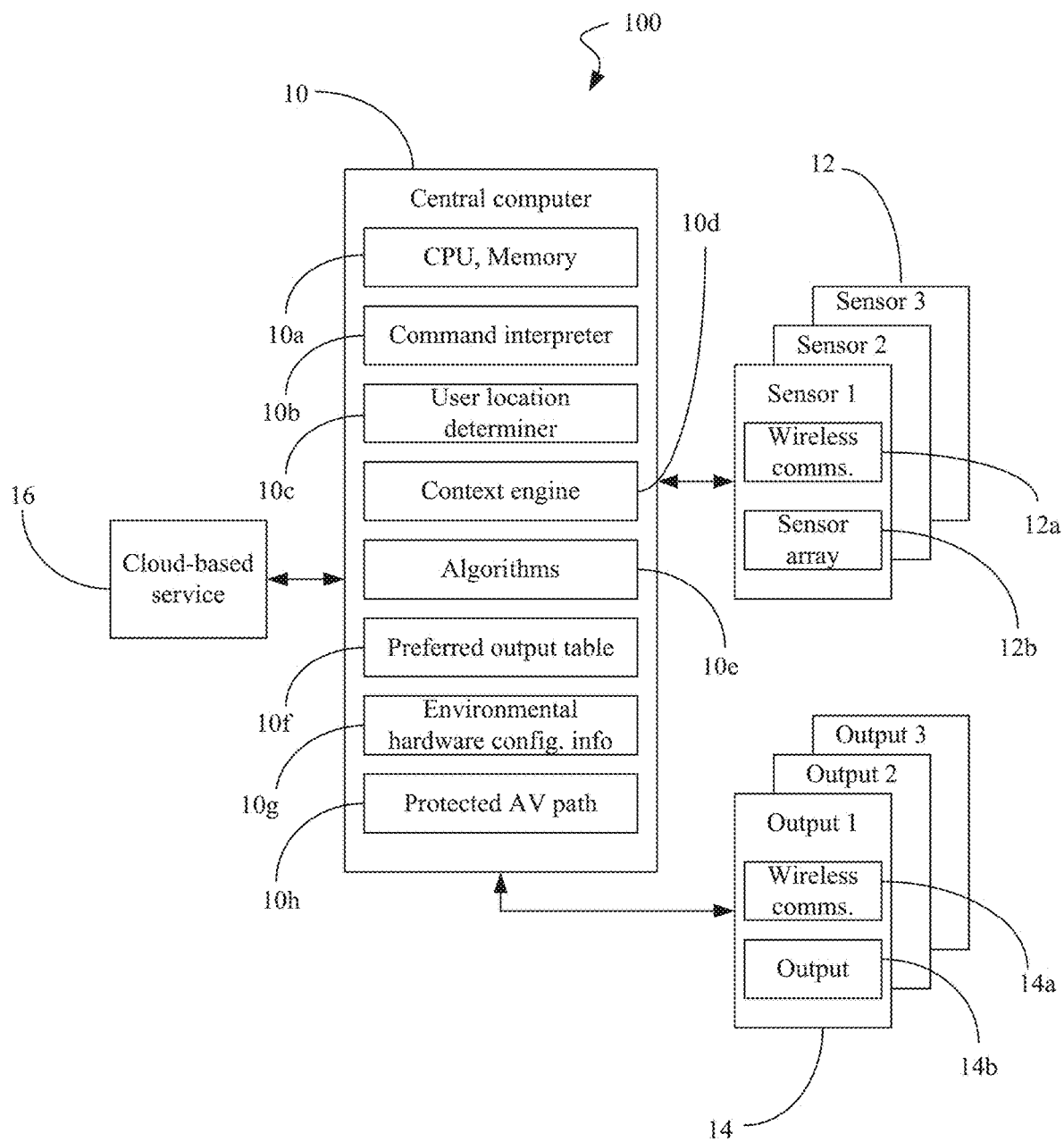
FIG. 1A is block diagram of an example of a delineated monitoring system according to an embodiment.

Turning now to FIG. 1A, a delineated monitoring system 100 is illustrated. The delineated monitoring system may generally include, but is not limited to, wireless communication systems, wearable computing systems, radio frequency identification (RFID) systems, voice recognition systems, and artificial intelligence (AI) systems.

The delineated monitoring system 100 may include a central computer 10, one or more sensors 12, one or more output devices 14, and a cloud-based service 16. The central computer may further include a central processing unit (CPU) and memory devices 10a a command interpreter 10b, a user location determiner 10c, a context engine 10d, various algorithms 10e, an output table 10f, environmental hardware configuration information 10g, and a protected audio/visual (AV) path 10h.

The sensors 12 may include wireless communication applications 12a and sensor arrays 12b, and the output devices 14 may include wireless communication applications 14a and an output apparatus 14b. The output apparatus 14b may include, but is not limited to, laser devices or light emitting diodes (LED's). Specifically, the output devices 14 may include, but are not limited to, projectors, audio output devices, ambient lighting, augmented reality (AR), and haptic from wearable devices.

As discussed in greater detail below, the delineated monitoring system 100 may visually or orally indicate to users the area or areas in a particular space that are currently being monitored. The areas may be monitored by devices such as, for example, sensors, cameras, microphones, motion detectors, and capacitive surfaces. Users may make oral or visual inputs such as gestures into the delineated monitoring system to query the boundaries of the coverage area, or to control or change the coverage area.

Figure 1B:
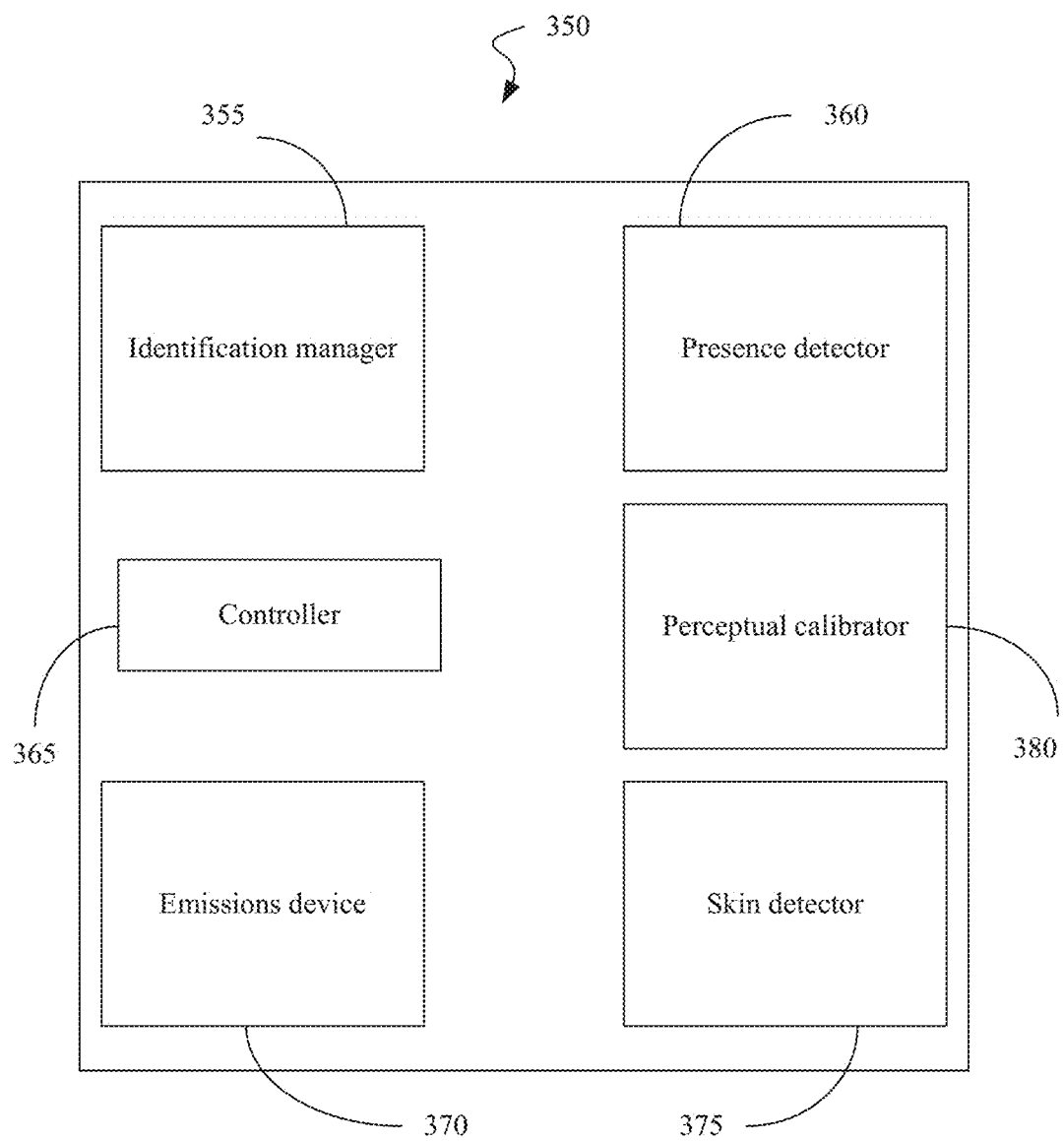
FIG. 1B is a block diagram of an example of a delineated monitoring apparatus according to an embodiment.

Turning now to FIG. 1B, an example of a delineated monitoring apparatus 350 according to an exemplary embodiment is illustrated. The delineated monitoring apparatus 350 may include an identification manager 355, a presence detector 360, an emissions device 370, a controller 365, a skin detector 375, and a perceptual calibrator 380.

The identification manager 355 may identify a physical space where monitoring of objects or individuals may take place. The physical space may include, but is not limited to a workplace environment, an office space, a sports arena, or rooms within a home.

The presence detector 360 may detect the presence of the object or individuals within the physical space based on one or more signals received from one or more sensors (not shown) that are positioned in the physical space. The sensors (not shown) may include, but are not limited to, cameras, microphones, motion sensors, or capacitive surfaces.

An emissions device 370 may trigger, upon detection of the object presence, or upon the request of a user, a demarcation line that defines an indicated perimeter within the physical space that is being monitored.

The skin detector 375 may detect the state of dress of individuals who are present in the physical space. Specifically, according to an exemplary embodiment, the skin detector may determine the percentage of human skin that is exposed on individuals in the physical space. If a determination is made that the percentage of human skin that is being exposed is above a threshold level, detection within the physical space may be terminated. Additionally, any captured images that include a percentage of human skin that is above a predetermined threshold level where individuals in the physical space are partially clothed, may be discarded.

The perceptual calibrator 380 may operate to control the presence detector 360 based on one or more of a hand or finger gesture of an individual within the physical space, a state of dress of an individual within the physical space, or speech characteristics of an individual within the physical space. For example, if individuals within the physical space are speaking at a level that is below a predetermined threshold, for example, a whisper, the perceptual calibrator 380 may control the presence detector 360 to terminate detection within the physical space.

Figure 2A:
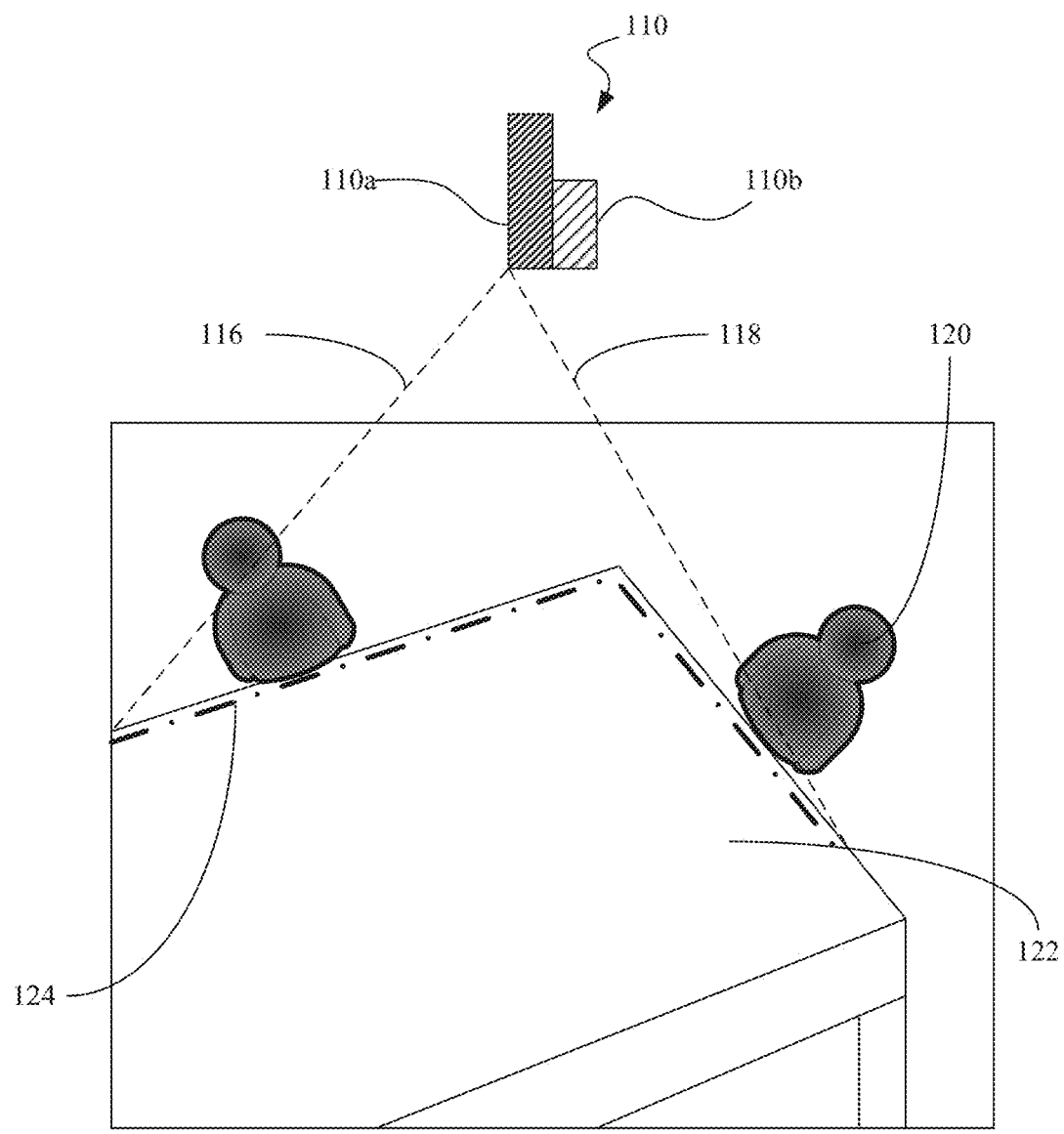
FIGS. 2A and 2B are illustrations of examples of a delineated monitoring system according to another embodiment.

Turning now to FIG. 2A, an example of a delineated monitoring system according to an exemplary embodiment is illustrated. The embodiment in FIG. 2A illustrates a projection system that includes an output device 110a such as, for example, a projector, and a camera 114. The output device 110a and the camera 114 may be positioned above a surface 122 such as, for example, a tabletop on which various users 120 may be interacting. The projection system 110 may track the activities that the users 120 are involved with, and may also project images or figures that the users 120 may interact with. Users may output a query to indicate the area on the surface 122 that the projection system 110 is covering, or the area in the space that is being monitored by the projection system 110, and in response to the query, the projection system 110 may emit beams such as, for example, a first beam 116, and a second beam 118, that indicate, via a demarcation 124, a coverage area or perimeter that is currently being monitored.

According to an exemplary embodiment, the surface 122 may be equipped with haptic feedback devices (not shown). Accordingly, users may output a voice query while touching the surface 122 inquiring whether the surface 122 is sensing-enabled for touch or whether the surface is being monitored. In response, a feedback response such as a vibration may be output. The user may then be informed that the surface 122 is indeed being monitored.

Figure 2B:
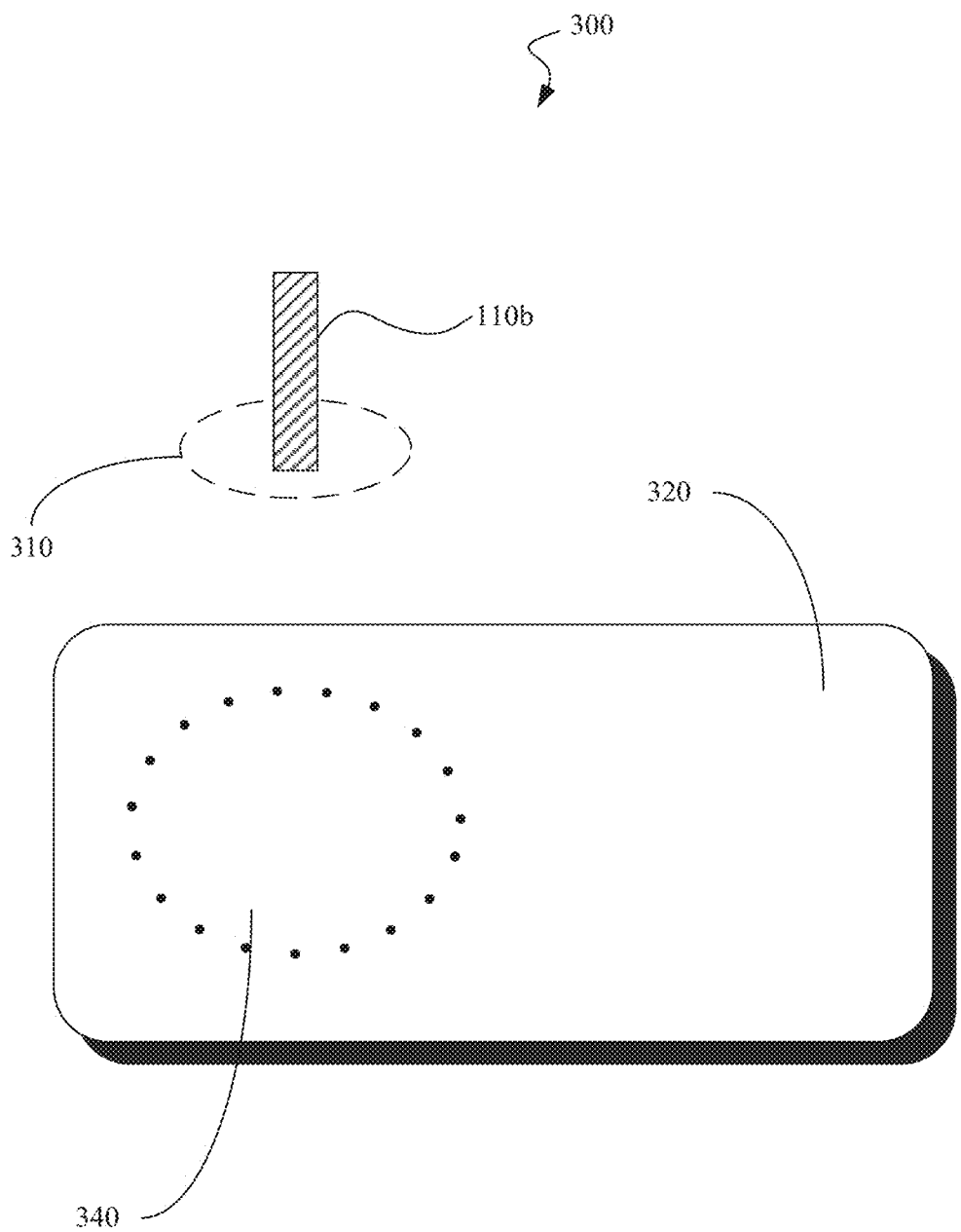

With continuing reference to FIGS. 2A and 2B, an example of a hardware configuration 300 of the camera 110b of the projection system 110 is illustrated. According to the exemplary embodiment, a ring of light emitting diodes (LEDs) 310 may be attached to the camera 110b. The hardware configuration may make it difficult for a hacker to distort the visual indication of a monitored space. If the projection system 110 is monitoring activities being conducted on a tabletop 320, the range of the area that is being covered by the camera may be indicated by a camera range indication 340.

Figure 3A:
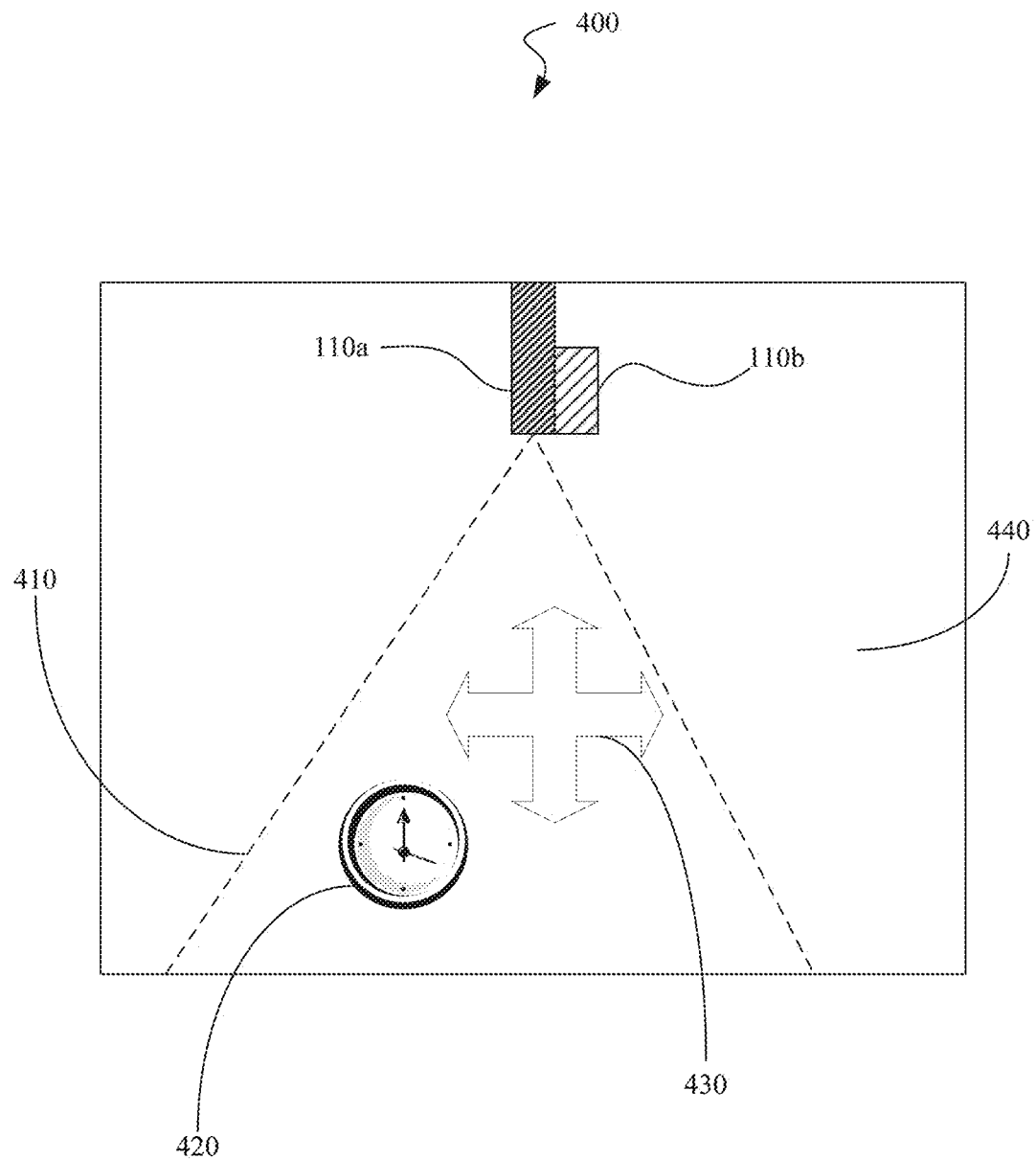
FIG. 3A is another illustration of an example of a delineated monitoring system according to another embodiment.

Turning now to FIG. 3A, another example of a delineated monitoring system according to an exemplary embodiment is illustrated. The system may be located, for example, in a facility such as a warehouse, school, or office. The system may report to users and individuals in the monitored spaces that specific areas of the spaces are being monitored or will be monitored at a specific time. For example, the illustrated projection system 110 may project images such as a clock 420 or directional arrows 430 that respectively illustrate a time that monitoring is scheduled to begin, and a direction in which the monitoring will proceed. If the projection system 110 is a motion sensing system, the projected image of a clock 420 may indicate that motion sensing within the monitored space 440 will begin at the indicated time, for example, 4:00 am. According to another exemplary embodiment, the projection system 110 may also project icons indicating what aspects of images within the monitored spaces are being captured. For example, the projection system 110 may project icons indicating that full red, green, and blue (RGB) images are being captured, the contours of individuals will be captured, or that speech made within the monitored area will be captured.

Figure 3B:
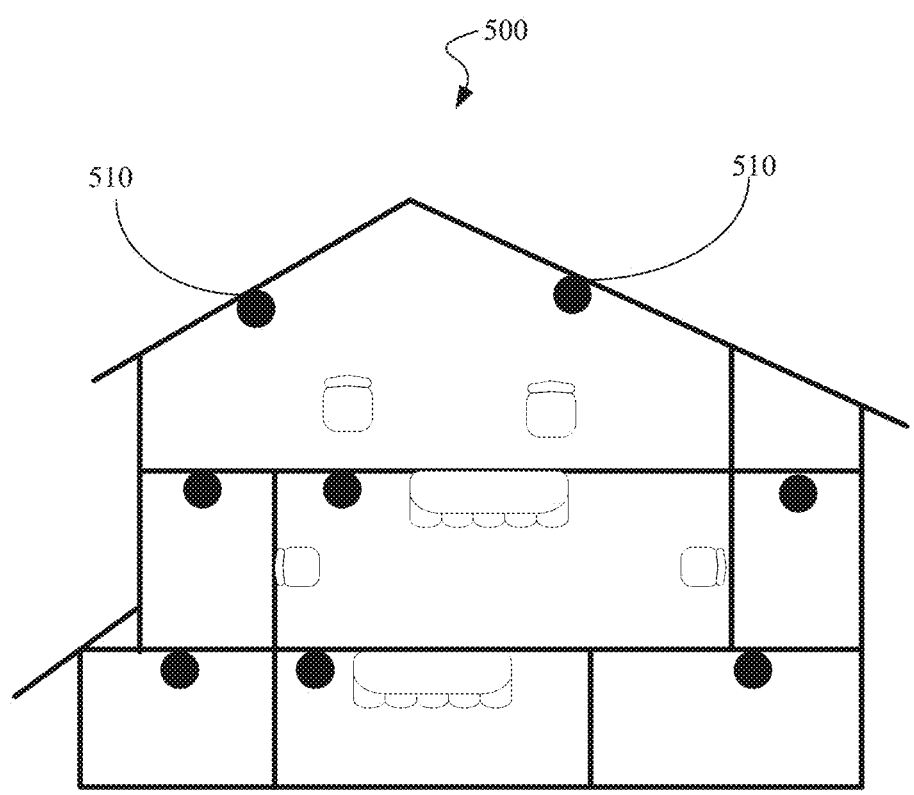
FIG. 3B is an illustration of speech recognition coverage of a delineated monitoring system according to another embodiment.

FIG. 3B illustrates another exemplary embodiment in which microphones 510 are installed within a facility or space 500 such as, for example, a home. Users within the facility may control the manner in which recording is done. For example, the users may control the microphones 510 to stop recording when conversation is detected within specific rooms, or alternately, to begin recording when conversation is detected within specific rooms. Users may also control the microphones to terminate a recording process when the voices of specific individuals are detected, in order to protect the privacy of the conversations of those individuals.

For small, private, monitored spaces, such as rooms in the space 500, the space may also include a persistent indicator, for example, via a projection on a wall, that shows through iconography what the monitoring modalities present in that particular space are, and their current state (e.g., active, completely disabled, partially disabled due to perceptual calibration, etc.). The utilization of a persistent indication may assist in alleviating fears or concerns of individuals entering a space 500 that is known to be monitored.

According to another exemplary embodiment, the users of the space 500 may control the system to terminate the monitoring of conversations within the space 500 if the level of the conversations reaches a predetermined level. For example, if individuals within the space 500 are speaking at an auditory level that corresponds to a whisper, the system may be controlled to terminate monitoring of the conversations in the monitored space, or disregard the detected conversations, if that particular auditory level is attained.

Additionally, a user may input a query to the delineated monitoring system requesting that an audio output be made indicating whether specific areas within the space 500 are subjected to being monitored by microphones 510. The delineated monitoring system may subsequently emit an audio signal indicating whether or not the specific areas may be monitored.

According to another exemplary embodiment, upon entry by an individual into a specific area of the space 500, a motion activated speaker system (not shown) may emit a tone alerting the individual that the specific area may be monitored by microphones 510.

According to another embodiment the delineated monitoring system may emit a chemical substance that may be detectable by an individual as a smell, thus indicating the area is being monitored.

Perceptual calibrations may also be used to control a monitoring state based on the level or states of dress of individuals in a space 500. For example, the system may be trained to determine a level or percentage of dress of individuals in the space, or a level or percentage of human skin being shown, and if the individuals are only partially clothed, the camera 114 may be turned off while the detected individuals are present in the space.

According to another exemplary embodiment, the delineated monitoring system may also use ambient lighting to show users specific rooms or areas that are currently being monitored. For example, in response to a user query requesting information regarding whether monitoring is being conducted in a particular room or space, the lights in that room may flash a predetermined number of times. The flashing lights may alert individuals in the room or space that monitoring by various sensors is currently being conducted.

According to yet another exemplary embodiment, monitoring may be changed or adjusted based on the identity of the individual that enters a particular space. For example, if an individual who enters a space is recognized by the delineated monitoring system by a detection system such as, but not limited to, a facial recognition system, a voice recognition system or an iris detection system, the system may proceed with a recording process, based on other controls that have been set by the user.

On the other hand, if the delineation monitoring system does not recognize an individual that enters a particular space, the delineated monitoring system may change or terminate monitoring, since the individual may not have given consent to be recorded.

According to an exemplary embodiment, the delineated monitoring system may include displays that indicate the destination of the recorded information. For example, the space 500 may include a display device, (not shown), which indicates that recorded data is being transmitted to a cloud-based service 16 (FIG. 1) for storage or image recognition processes. The display device may include, for example, a smart television (TV), a display (e.g., liquid crystal display (LCD), a cathode ray tube (CRT) monitor, a plasma display, etc.), a personal digital assistant (PDA) imaging device, a mobile Internet device (MID), any smart device such as a smart phone, smart tablet, and so forth, or any combination thereof.

According to yet another embodiment, the indication of monitored spaces may be shown via augmented reality (AR). AR is a live view of a physical real-world environment, whose elements are augmented by computer-generated inputs such as sound, graphics, or video. The augmentation may be in real-time, and a user may view what is being monitored with an AR overlay of the monitored area on a display device.

Figure 3C:
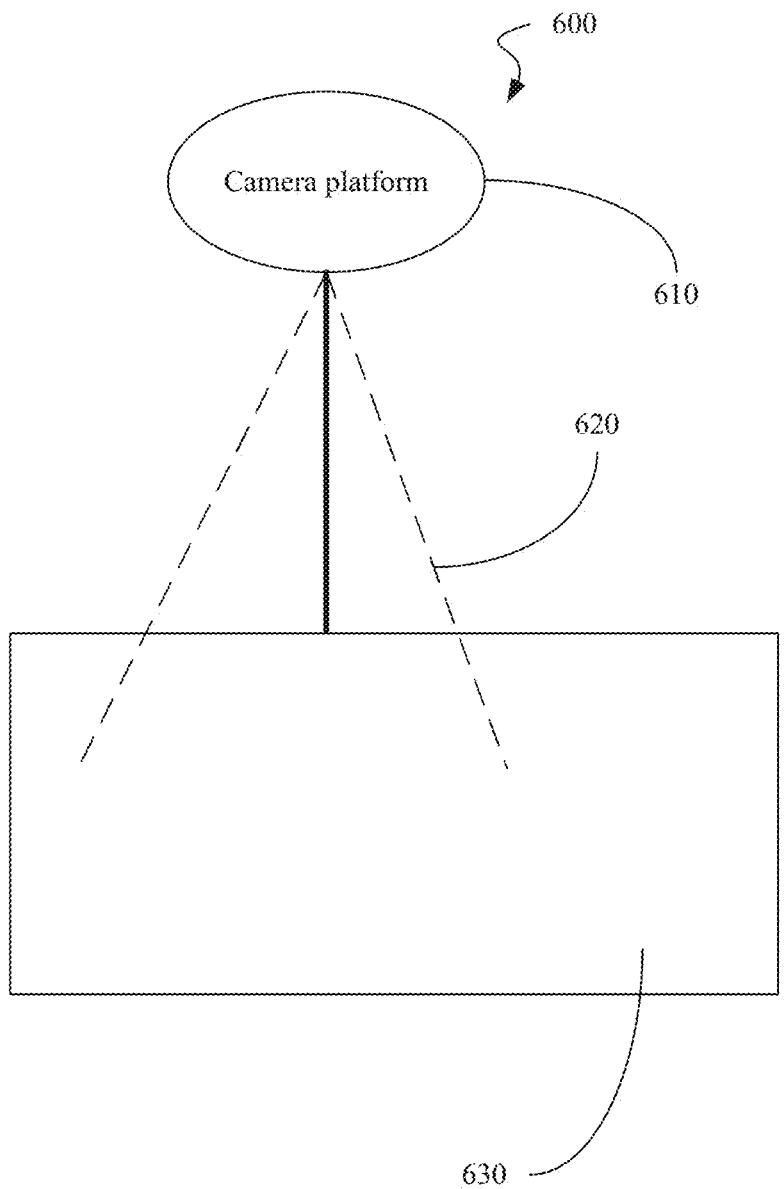
FIG. 3C is another illustration of an example of a delineated monitoring system according to another embodiment.

Turning now to FIG. 3C, another example of a delineated monitoring system according to an exemplary embodiment is illustrated. According to the exemplary embodiment, camera platforms 610 may be mounted in an external environment 630 such as a sports arena. The camera platforms 610 may allow remote viewers to see portions of the arena, and projections 620 may alert individuals in the external arena 630 to the areas that are being monitored by the camera platforms 610. The projections 620 may be spot lights, but are not limited thereto.

Figure 4A:
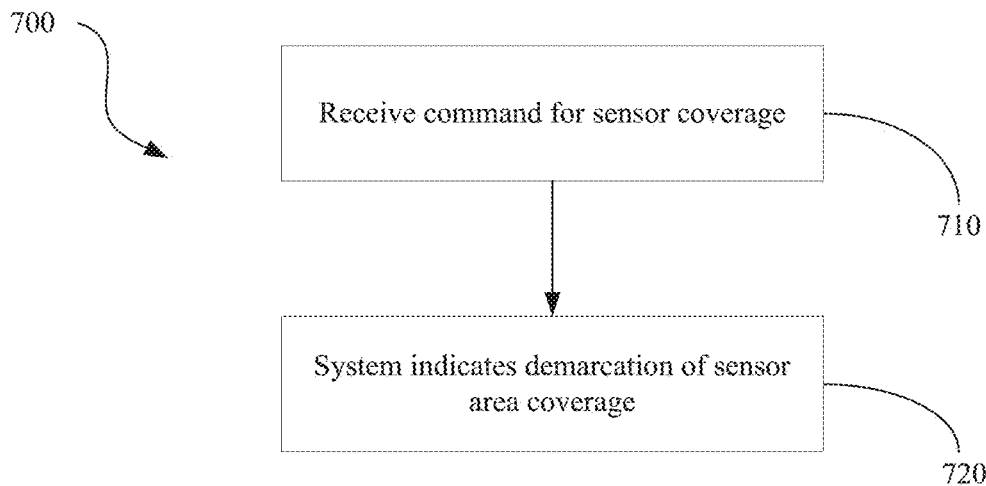
FIGS. 4A to 4D illustrate flowcharts of examples of methods of operating a delineated monitoring apparatus according to various embodiments.

FIG. 4A illustrates a method 700 of indicating, by demarcation, an area that is currently being monitored according to an embodiment. The method 700 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 700 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In illustrated processing block 710, the delineated monitoring system may receive a command or query to determine whether an area is being monitored by various sensors or to access system parameters. Different permissions may be granted to different individuals in order to issue queries to the delineated monitoring system or change system parameters. For example, if the space being monitored is a home, a parent may be granted permission to set various rules controlling how the monitoring of the space will be conducted. These rules include, but are not limited to, a time that monitoring will begin and end, speech levels at which recording will be conducted, the level of detected clothing being worn by individuals at which recording will terminate, specific individuals who should not be recorded, or whether the delineated monitoring system should capture the full body image, a blurred image or a silhouette of an individual.

If the command that is received by the delineated monitoring system in processing block 710 is a command to indicate the coverage area in a monitored space, in processing block 720 the delineation monitoring system indicates a demarcation of the sensor coverage area. The sensor coverage area may be shown by one or more of a demarcation line 124 (FIG. 2A), a camera range indication 340 (FIG. 2B) or ambient lighting.

Figure 4B:
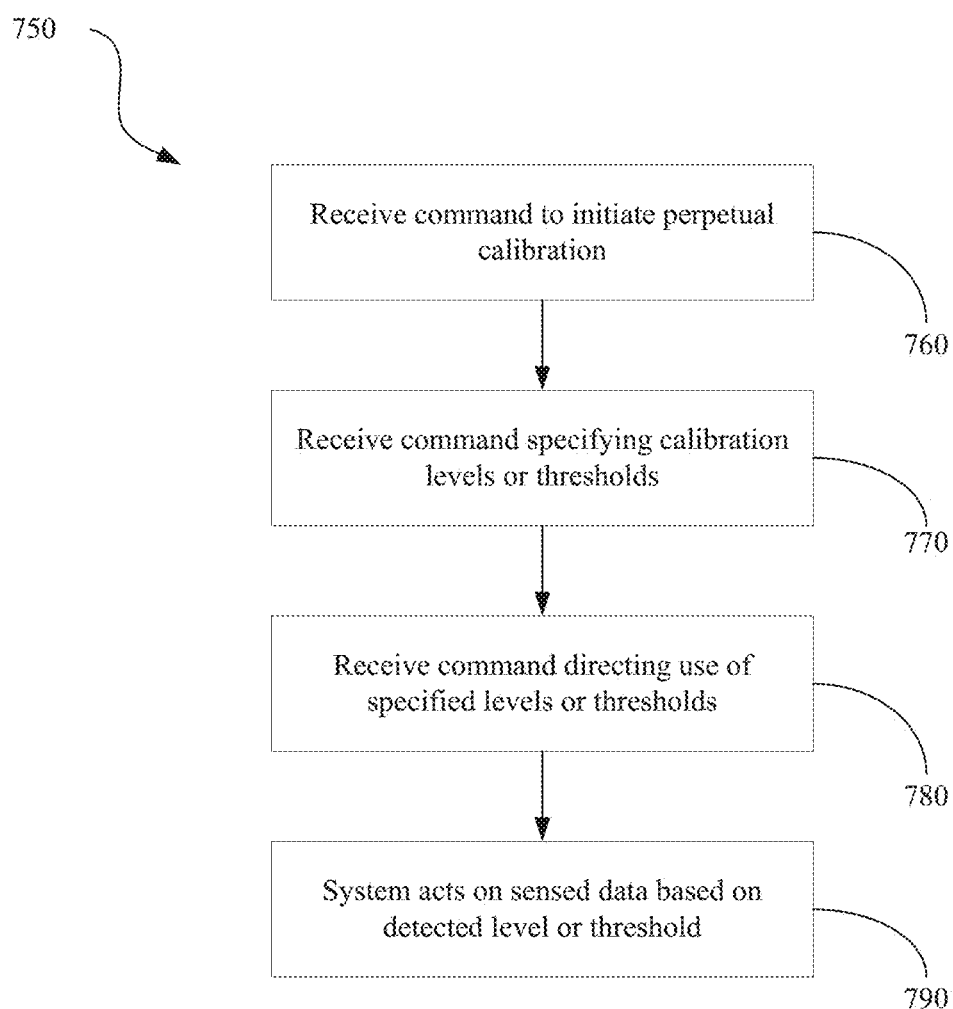

Turning now to FIG. 4B, a method 750 of conducting perceptual calibration is illustrated. The method 750 may generally be implemented in a device such as, for example, a smart phone, tablet computer, notebook computer, tablet computer, convertible tablet, PDA, MID, wearable computer, desktop computer, media player, smart TV, gaming console, etc., already discussed. More particularly, the method 750 may be implemented as a set of logic instructions stored in a machine- or computer-readable medium of a memory such RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 750 may be written in any combination of one or more programming languages, including an object oriented programming language such as JAVA, SMALLTALK, C++ or the like and conventional procedural programming languages, such as the "C" programming language or similar programming languages.

The illustrated method begins at processing block 760 where the delineated monitoring system initiates perceptual calibration. Perceptual calibration may involve using hand and finger gestures, facial recognition, facial tracking, speech recognition, and AR to achieve specific functions. In processing block 770, the delineated monitoring system may receive specific levels or thresholds of captured information that should be retained or processed. For example, the user may specify that conversations that are below a predetermined threshold level, such as a threshold level that corresponds to a whisper, should not be recorded. The user may also specify that individuals whose level of clothing is below a certain threshold should not be recorded. Upon specifying specific levels or thresholds for recording, in illustrated processing block 780, the delineated monitoring system may direct that the specified levels or thresholds be used during monitoring periods.

In processing block 790, the delineated monitoring system may act on sensed data based on a detected level or threshold of data such as speech levels.

Figure 4C:
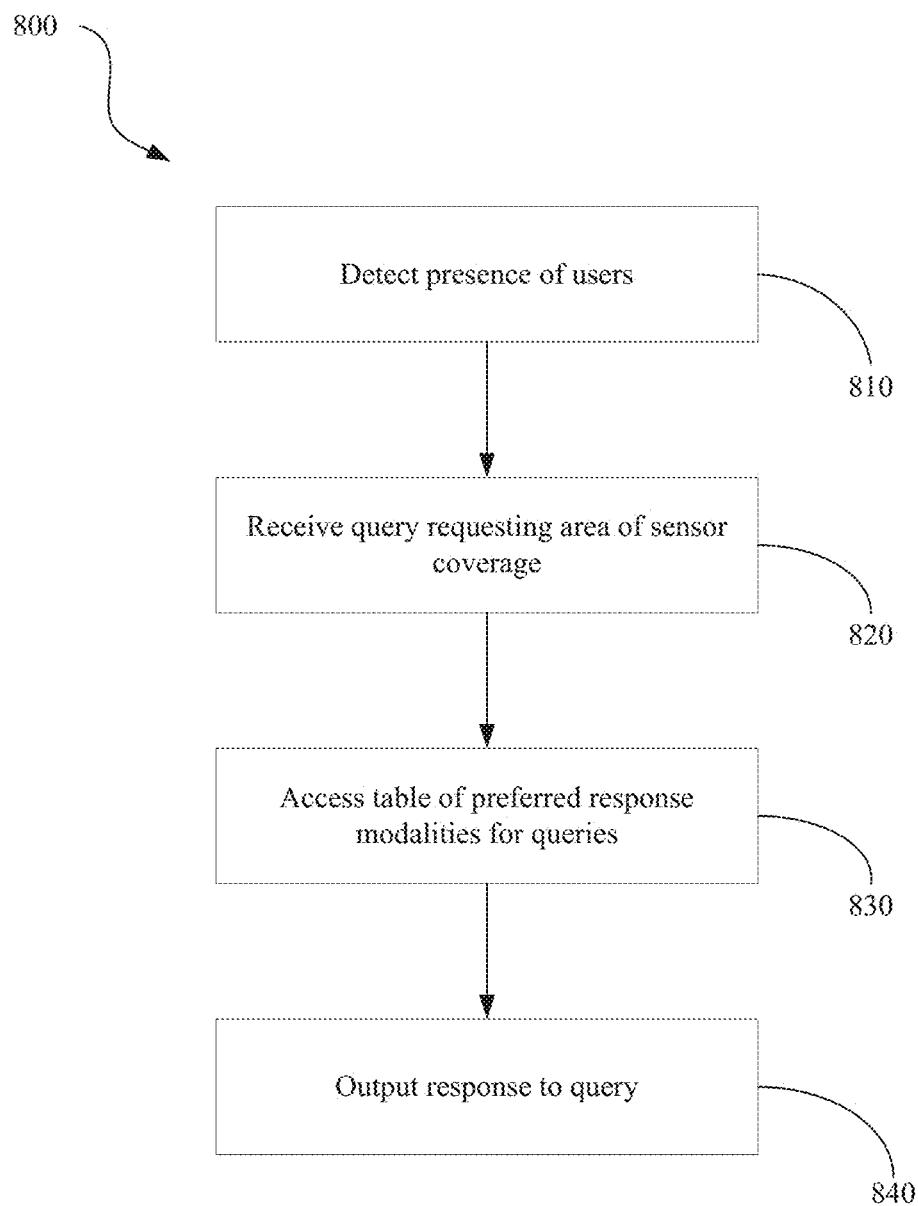

Turning now to FIG. 4C, a method 800 of generating a response to a user query is illustrated. The method 800 may generally be implemented in a device such as, for example, a smart phone, tablet computer, notebook computer, tablet computer, convertible tablet, PDA, MID, wearable computer, desktop computer, media player, smart TV, gaming console, etc., already discussed. More particularly, the method 800 may be implemented as a set of logic instructions stored in a machine- or computer-readable medium of a memory such RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 800 may be written in any combination of one or more programming languages, including an object oriented programming language such as JAVA, SMALLTALK, C++ or the like and conventional procedural programming languages, such as the "C" programming language or similar programming languages.

The illustrated method begins at processing block 810, where the delineated monitoring system may detect the presence of users in an area to be monitored. The presence of the users may be detected by sensors such as motion sensors and heat detection systems. At processing block 820, the delineated monitoring system may receive a query requesting an indication of the area of sensor coverage.

At processing block 830, the delineated monitoring system may access a table (for example, the preferred output table 10F, FIG. 1) of preferred response modalities. The table of preferred response modalities, and the priorities of the response modalities may include entries such as:

| Query | Preferred Response Modality |
| --- | --- |
| Voice input for speech detection coverage | Audio 1$^{st}$, Projection 2$^{nd}$, Light blink 3$^{rd}$ |
| Voice request to show camera coverage | Projection 1$^{st}$, Screen 2$^{nd}$, Audio 3$^{rd}$, Light blink 4$^{th}$ |
| Touch gesture to request touch sensing | Haptic 1$^{st}$, Projection 2$^{nd}$, Audio 3$^{rd}$ |

At processing block 840, the delineated monitoring system may output a response to the query based on the type of query and the preferred response associated with the query. For example, if the query is a voice request to show the area of camera coverage, the delineated monitoring system may access the preferred output table 10F (FIG. 1) and determined that the preferred response is to project a demarcation 124 (FIG. 2A). The second preferred response modality to the voice request may be to display the area of camera coverage on a screen, the third preferred response modality may be to output an audio response, and the fourth preferred response may be flash a light fixture a predetermined number of times.

Figure 4D:
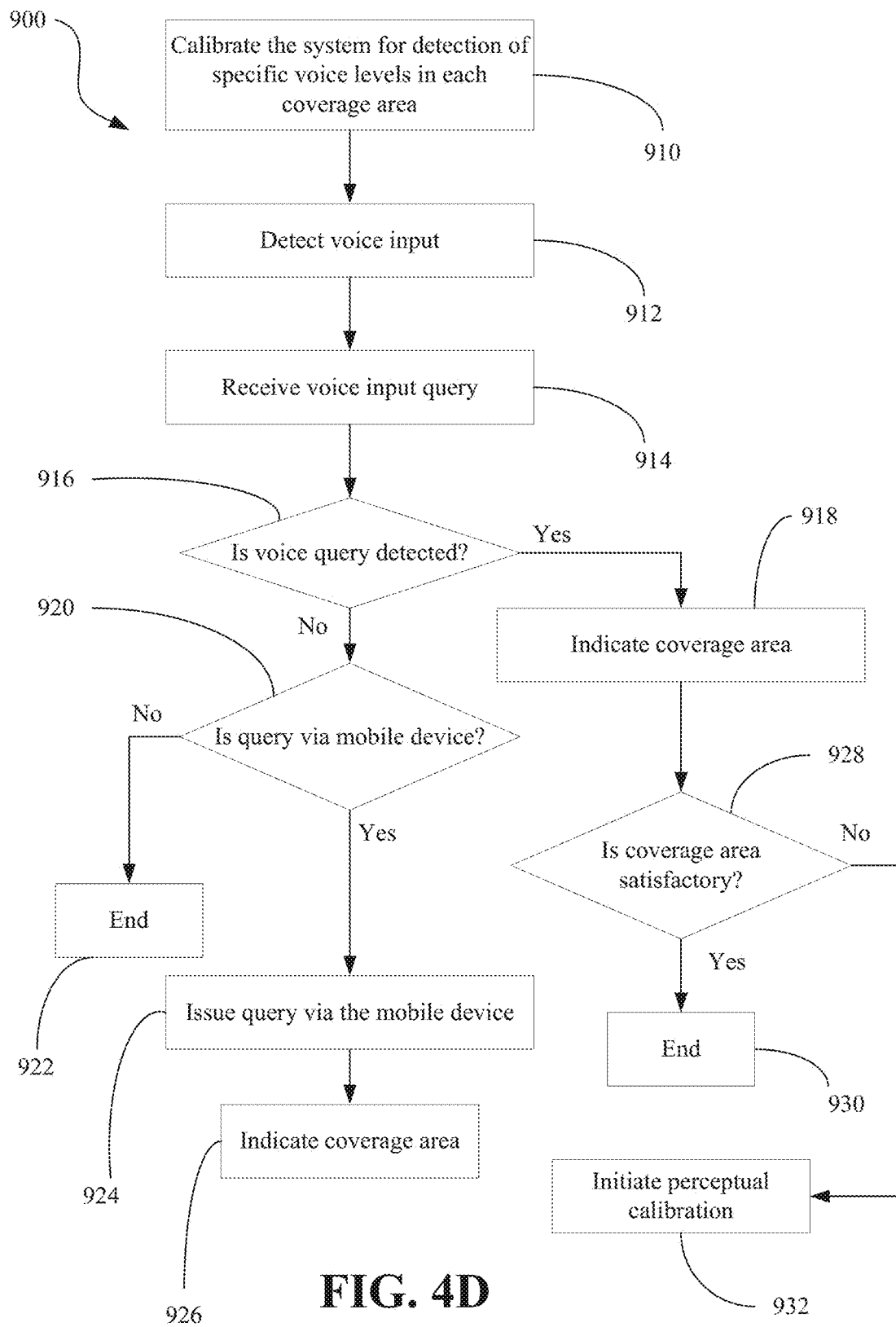

Turning now to FIG. 4D, a method 900 of indicating a sensor coverage area in a delineated monitoring system is illustrated. The method 900 may generally be implemented in a device such as, for example, a smart phone, tablet computer, notebook computer, tablet computer, convertible tablet, PDA, MID, wearable computer, desktop computer, media player, smart TV, gaming console, etc., already discussed. More particularly, the method 900 may be implemented as a set of logic instructions stored in a machine- or computer-readable medium of a memory such RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 900 may be written in any combination of one or more programming languages, including an object oriented programming language such as JAVA, SMALLTALK, C++ or the like and conventional procedural programming languages, such as the "C" programming language or similar programming languages.

The illustrated method 900 begins at processing block 910, where the delineated monitoring system may be calibrated for specific voice levels in the coverage area. At processing block 912, the delineated monitoring system may detect a voice input, and at processing block 914, the delineated monitoring system may determine whether the detected voice input is a query. If a voice query is detected at processing block 916, the sensor coverage area may be indicated at processing block 918. The sensor coverage area may be indicated by, for example, demarcation lines 124 (FIG. 2A), ambient lighting, an audio output, or an LED indication.

If, at processing block 928 the user is satisfied with the coverage area, the process ends at processing block 930. On the other hand, if the user is not satisfied with the coverage area, the user may initiate perceptual calibration at processing block 932, wherein hand and finger gestures, facial tracking, speech recognition, or AR may be used to determine a coverage area.

Returning to processing block 916, if the delineated monitoring system does not detect the voice query, a determination is made via processing block 920 whether the user has made the query via a mobile device. If the user has not made the query via a mobile device, the process ends at processing block 922. If, on the other hand it is determined at processing block 924 that the user has issued the query via a mobile device, then at processing block 926 the delineated monitoring system may indicate the coverage area via an available output or via the mobile device.

Figure 5:
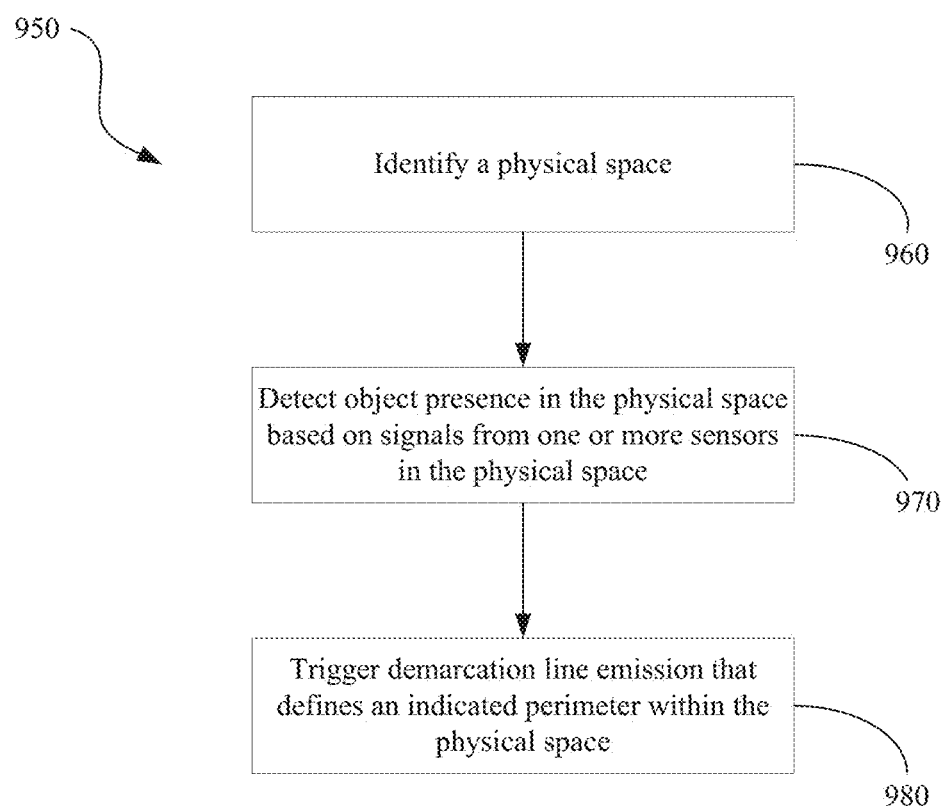
FIG. 5 illustrates a flowchart of an example of a method of projecting a coverage area according to another embodiment.

Turning now to FIG. 5, a method 950 of generating a response to a user query is illustrated. The method 950 may generally be implemented in a device such as, for example, a smart phone, tablet computer, notebook computer, tablet computer, convertible tablet, PDA, MID, wearable computer, desktop computer, media player, smart TV, gaming console, etc., already discussed. More particularly, the method 950 may be implemented as a set of logic instructions stored in a machine- or computer-readable medium of a memory such RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 950 may be written in any combination of one or more programming languages, including an object oriented programming language such as JAVA, SMALLTALK, C++ or the like and conventional procedural programming languages, such as the "C" programming language or similar programming languages.

The illustrated method begins at processing block 960, wherein a physical space to be monitored may be identified. According to an exemplary embodiment, the physical space may be monitored by a projector sub-system systems that include a projector 110a (FIG. 2A) and a camera 114 (FIG. 2A). The physical space may also be monitored by microphones 510 (FIG. 3B) or other sensors. At processing block

970, an object presence within the physical space may be detected based on signals received from one or more sensors in the physical space. At illustrated processing block 980, a demarcation line emission may be triggered if an object presence is detected in the physical space. The demarcation line may define a perimeter within the physical space that is being monitored, and may be automatically triggered, or may be triggered on the basis of a command from a user.

Figure 6:
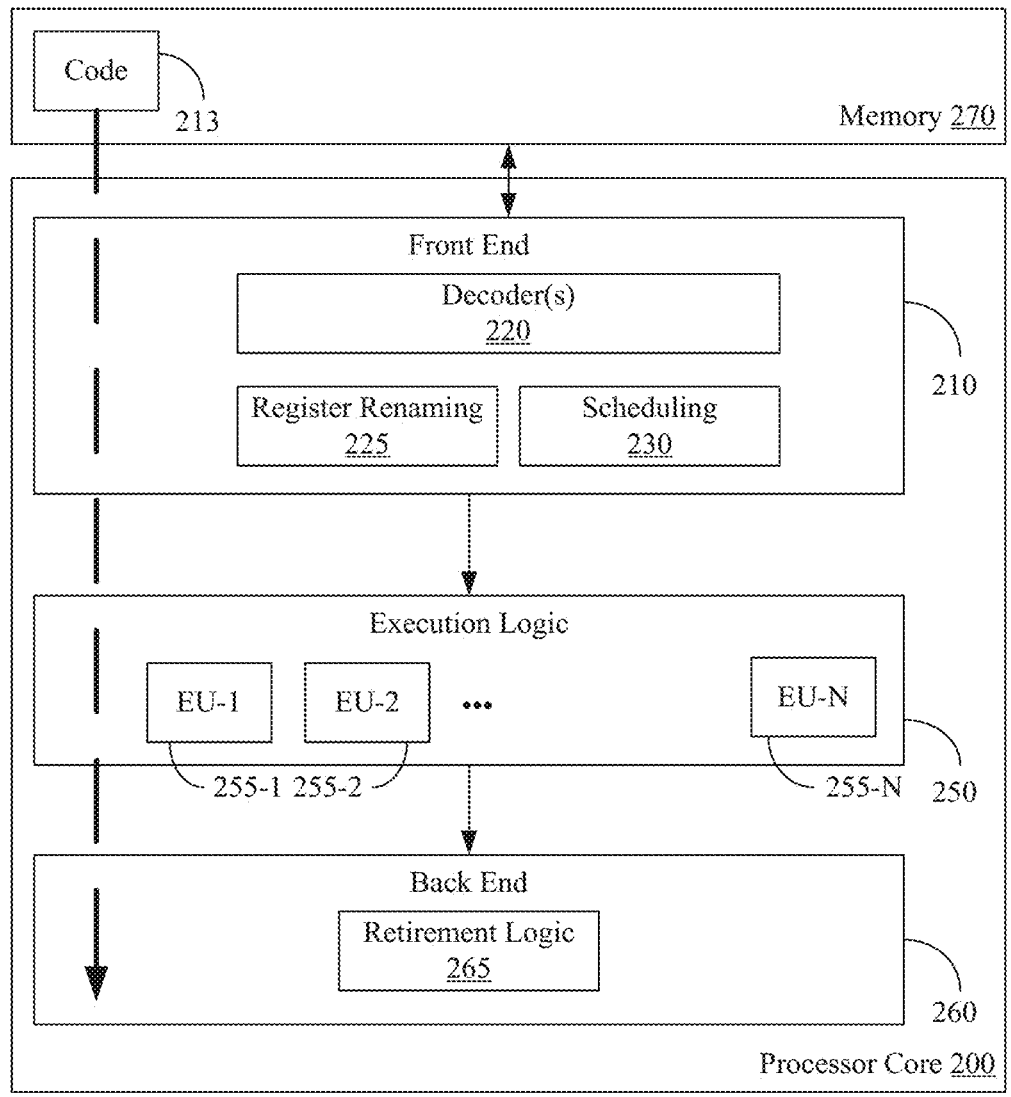
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 700 (FIG. 4A), the method 750 (FIG. 4B), the method 800 (FIG. 4C), the method 900 (FIG. 4D), and/or the method 950 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals that reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., biometric scanners, speakers, cameras, sensors) may be coupled to the first bus 1016, along with a bus bridge 1018, which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device that may include code 1030, in one embodiment. The illustrated code 1030 may implement one or more aspects of the method 700 (FIG. 4A), the method 750 (FIG. 4B), the method 800 (FIG. 4C), the method 900 (FIG. 4D), and/or the method 950 (FIG. 5), already discussed, and may be similar to the code 213 (FIG. 6), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a user-based delineated monitoring system comprising a processor, one or more mass storage devices coupled to the processor, one or more sensors coupled to the processor, an output subsystem coupled to the processor, and a computer readable storage device comprising a set of instructions, which when executed by the processor, cause the processor to identify a physical space, detect an object presence in the physical space based on one or more signals from at least one of the one or more sensors, and trigger, based on the object presence, a demarcation line emission that defines an indicated perimeter within the physical space.

Example 2 may include the system of example 1, wherein the one or more sensors include one or more of cameras, microphones, motion sensors, or capacitive surfaces.

Example 3 may include the system of example 1, wherein the output subsystem includes one or more of a projector, an audio output device, a chemical output device, ambient lighting, an augmented reality subsystem, or a haptic feedback device.

Example 4 may include the system of any one of examples 1 to 3, wherein the output subsystem is to project one or more of an image of a timing symbol to indicate a monitored time of the indicated perimeter, or a directional symbol to indicate a monitored direction.

Example 5 may include the system of example 1, further comprising a speech recognition device to recognize a speech input from a user.

Example 6 may include the system of example 1, wherein the demarcation line is indicated by one or more of light emitting diodes (LEDs) or laser devices.

Example 7 may include a delineated monitoring apparatus comprising an identification manager to identify a physical space, a presence detector to detect an object presence in the physical space based on one or more signals from one or more sensors in the physical space; and an emissions device to trigger, based on the object presence, a demarcation line emission that defines an indicated perimeter within the physical space.

Example 8 may include the apparatus of example 7, further including a skin detector to detect a level of clothing on an individual in the physical space and to control the presence detector based on a result of the detecting.

Example 9 may include the apparatus of example 7, further including a perceptual calibrator to control the presence detector based on one or more of a gesture, a state of dress of a user within the physical space, or speech characteristics of the user.

Example 10 may include the apparatus of any one of examples 7 to 9, wherein the presence detector controls detection of the object presence based on an identity of the object.

Example 11 may include the apparatus of example 7, further comprising a speech recognition device to recognize a speech input from a user.

Example 12 may include the apparatus of example 7, wherein the demarcation line is to be indicated by one or more of light emitting diodes (LEDs) or laser devices.

Example 13 may include a method of operating a delineated monitoring apparatus comprising identifying a physical space, detecting an object presence in the physical space based on one or more signals from one or more sensors in the physical space; and triggering, based on the object presence, a demarcation line emission that defines an indicated perimeter within the physical space.

Example 14 may include the method of example 13, further including detecting a level of clothing on an individual in the physical space controlling a presence detector based on a result of the detecting.

Example 15 may include the method of example 13, further including controlling a presence detector based on one or more of a gesture, a state of dress of a user within the physical space, or speech characteristics of the user.

Example 16 may include the method of any one of examples 13 to 15, further comprising controlling detection of the object presence based on an identity of the object.

Example 17 may include the method of example 13, further comprising recognizing a speech input from a user.

Example 18 may include the method of example 13, further comprising indicating the perimeter with one or more of light emitting diodes (LEDs) or laser devices.

Example 19 may include at least one computer readable storage medium comprising a set of instructions, which when executed by an apparatus, cause the apparatus to identify a physical space, detect an object presence in the physical space based on one or more signals from one or more sensors in the physical space; and trigger, based on the object presence, a demarcation line emission that defines an indicated perimeter within the physical space.

Example 20 may include the at least one computer readable storage medium of example 19, further including detecting a level of clothing on an individual in the physical space controlling a presence detector based on a result of the detecting.

Example 21 may include the at least one computer readable storage medium of example 19, further including controlling a presence detector based on one or more of a gesture, a state of dress of a user within the physical space, or speech characteristics of the user.

Example 22 may include the at least one computer readable storage medium of any one of examples 19 to 21, further comprising controlling detection of the object presence based on an identity of the object.

Example 23 may include the at least one computer readable storage medium of example 19, further comprising recognizing a speech input from a user.

Example 24 may include the at least one computer readable storage medium of example 19, further indicating the perimeter with one or more of light emitting diodes (LEDs) or laser devices.

Example 25 may include a delineated monitoring apparatus comprising: means for identifying a physical space, means for detecting an object presence in the physical space based on one or more signals from one or more sensors in the physical space; and means for triggering, based on the object presence, a demarcation line emission that defines an indicated perimeter within the physical space.

Example 26 may include the method of example 25, further including means for detecting a level of clothing on an individual in the physical space controlling a presence detector based on a result of the detecting.

Example 27 may include the method of example 25, further including means for controlling a presence detector based on one or more of a gesture, a state of dress of a user within the physical space, or speech characteristics of the user.

Example 28 may include the method of any one of examples 25 to 27, further comprising means for controlling detection of the object presence based on an identity of the object.

Example 29 may include the method of example 25, further comprising means for recognizing a speech input from a user.

Example 30 may include the method of example 25, wherein the perimeter is to be indicated with one or more of light emitting diodes (LEDs) or laser devices.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A system comprising:
a processor;
one or more mass storage devices coupled to the processor;
one or more sensors coupled to the processor;
an output subsystem coupled to the processor; and
a computer readable storage device comprising a set of instructions, which when executed by the processor, cause the processor to:
identify a physical space;
detect an object presence in the physical space based on one or more signals from at least one of the one or more sensors, and
trigger, based on the object presence, a demarcation line emission that illuminates only a perimeter of an area within the physical space in which the object is present, wherein the demarcation line emission is to demarcate the area with a line.

2. The system of claim 1, wherein the one or more sensors include one or more of cameras, microphones, motion sensors, or capacitive surfaces.

3. The system of claim 1 wherein the output subsystem includes one or more of a projector, an audio output device, a chemical output device, ambient lighting, an augmented reality subsystem, or a haptic feedback device.

4. The system of claim 1, wherein the output subsystem is to project one or more of an image of a timing symbol to indicate a monitored time of the indicated perimeter, or a directional symbol to indicate a monitored direction.

5. The system of claim 1, further comprising a speech recognition device to recognize a speech input from a user.

6. The system of claim 1, wherein the demarcation line is indicated by one or more of light emitting diodes (LEDs) or laser devices.

7. An apparatus comprising:
an identification manager to identify a physical space;
a presence detector to detect an object presence in the physical space based on one or more signals from one or more sensors in the physical space; and
an emissions device to trigger, based on the object presence, a demarcation line emission that illuminates only a perimeter of an area within the physical space in which the object is present, wherein the demarcation line emission is to demarcate the area with a line.

8. The apparatus of claim 7, further including a skin detector to detect a level of clothing on an individual in the physical space and to control the presence detector based on a result of the detecting.

9. The apparatus of claim 7, further including a perceptual calibrator to control the presence detector based on one or more of a gesture, a state of dress of a user within the physical space, or speech characteristics of the user.

10. The apparatus of claim 7, wherein the presence detector controls detection of the object presence based on an identity of the object.

11. The apparatus of claim 7, further comprising a speech recognition device to recognize a speech input from a user.

12. The apparatus of claim 7, wherein the demarcation line is to be indicated by one or more of light emitting diodes (LEDs) or laser devices.

13. A method comprising:
identifying a physical space;
detecting an object presence in the physical space based on one or more signals from one or more sensors in the physical space; and
triggering, based on the object presence, a demarcation line emission that illuminates only a perimeter of an area within the physical space in which the object is present, wherein the demarcation line emission demarcates the area with a line.

14. The method of claim 13, further including detecting a level of clothing on an individual in the physical space controlling a presence detector based on a result of the detecting.

15. The method of claim 13, further including controlling a presence detector based on one or more of a gesture, a state of dress of a user within the physical space, or speech characteristics of the user.

16. The method of claim 13, further comprising controlling detection of the object presence based on an identity of the object.

17. The method of claim 13, further comprising recognizing a speech input from a user.

18. The method of claim 13, further comprising indicating the perimeter with one or more of light emitting diodes (LEDs) or laser devices.

19. At least one computer readable storage medium comprising a set of instructions, which when executed by an apparatus, cause the apparatus to:
identify a physical space;
detect an object presence in the physical space based on one or more signals from one or more sensors in the physical space; and
trigger, based on the object presence, a demarcation line emission that illuminates only a perimeter of an area within the physical space in which the object is present, wherein the demarcation line emission is to demarcate the area with a line.

20. The at least one computer readable storage medium of claim 19, further including detecting a level of clothing on an individual in the physical space controlling a presence detector based on a result of the detecting.

21. The at least one computer readable storage medium of claim 19, further including controlling a presence detector based on one or more of a gesture, a state of dress of a user within the physical space, or speech characteristics of the user.

22. The at least one computer readable storage medium of claim 19, further comprising controlling detection of the object presence based on an identity of the object.

23. The at least one computer readable storage medium of claim 19, further comprising recognizing a speech input from a user.

24. The at least one computer readable storage medium of claim 19, further indicating the perimeter with one or more of light emitting diodes (LEDs) or laser devices.

25. The apparatus of claim 8, wherein the perceptual calibrator controls the presence detector to terminate detection of the object presence based on the level of clothing detected on the individual.

26. The method of claim 14, further comprising controlling the presence detector to terminate detection of the object presence based on the level of clothing detected on the individual.

27. The at least one computer readable storage medium of claim 20, wherein the presence detector is to terminate detection of the object presence based on the level of clothing detected on the individual.

* * * * *